Oct. 1, 1968  C. A. RETHERFORD ET AL  3,403,709
PANEL BOARD POWER SAW APPARATUS

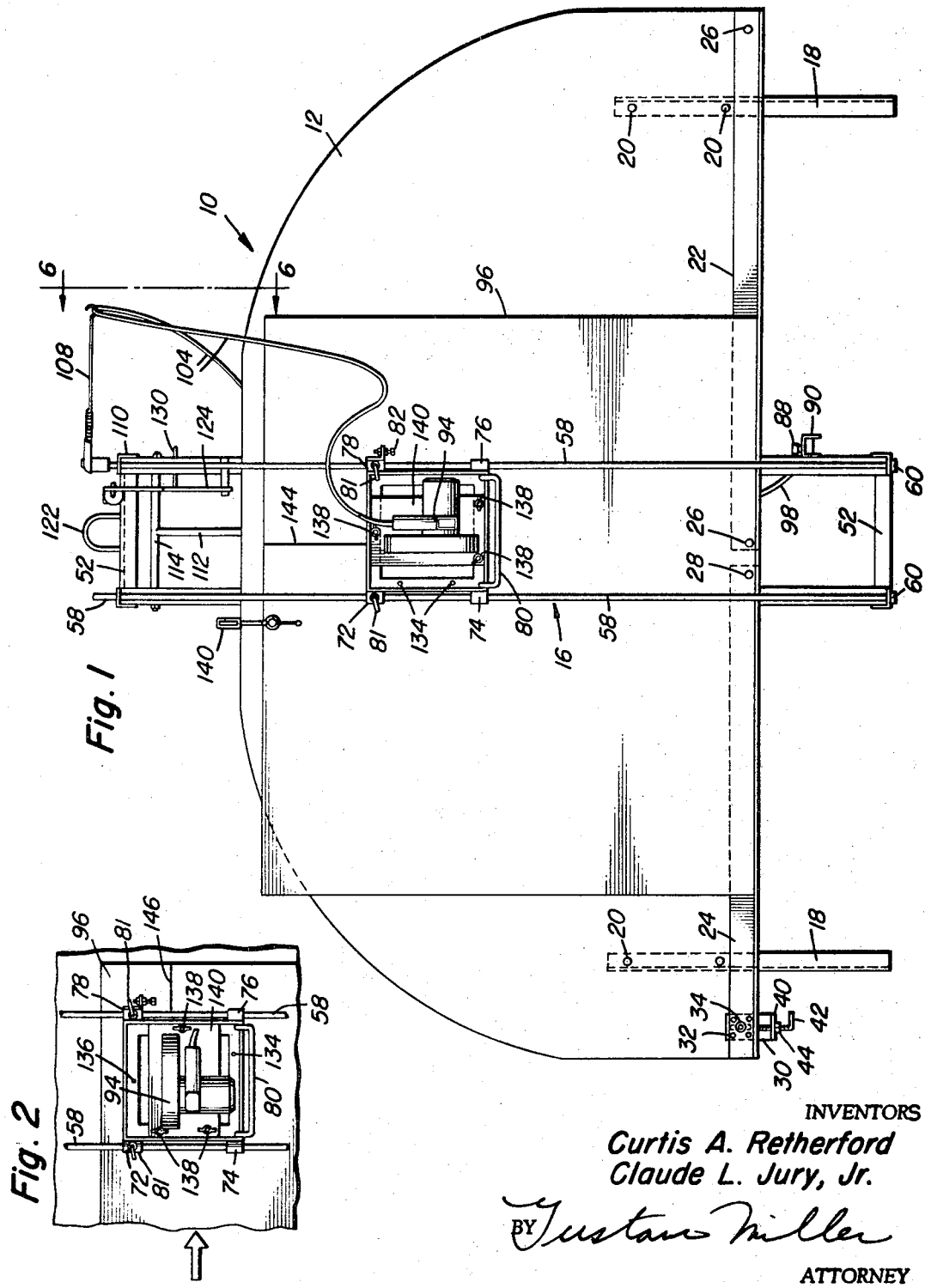

Filed Aug. 16, 1965  3 Sheets-Sheet 2

INVENTORS
Curtis A. Retherford
Claude L. Jury, Jr.

BY Gustave Miller
ATTORNEY

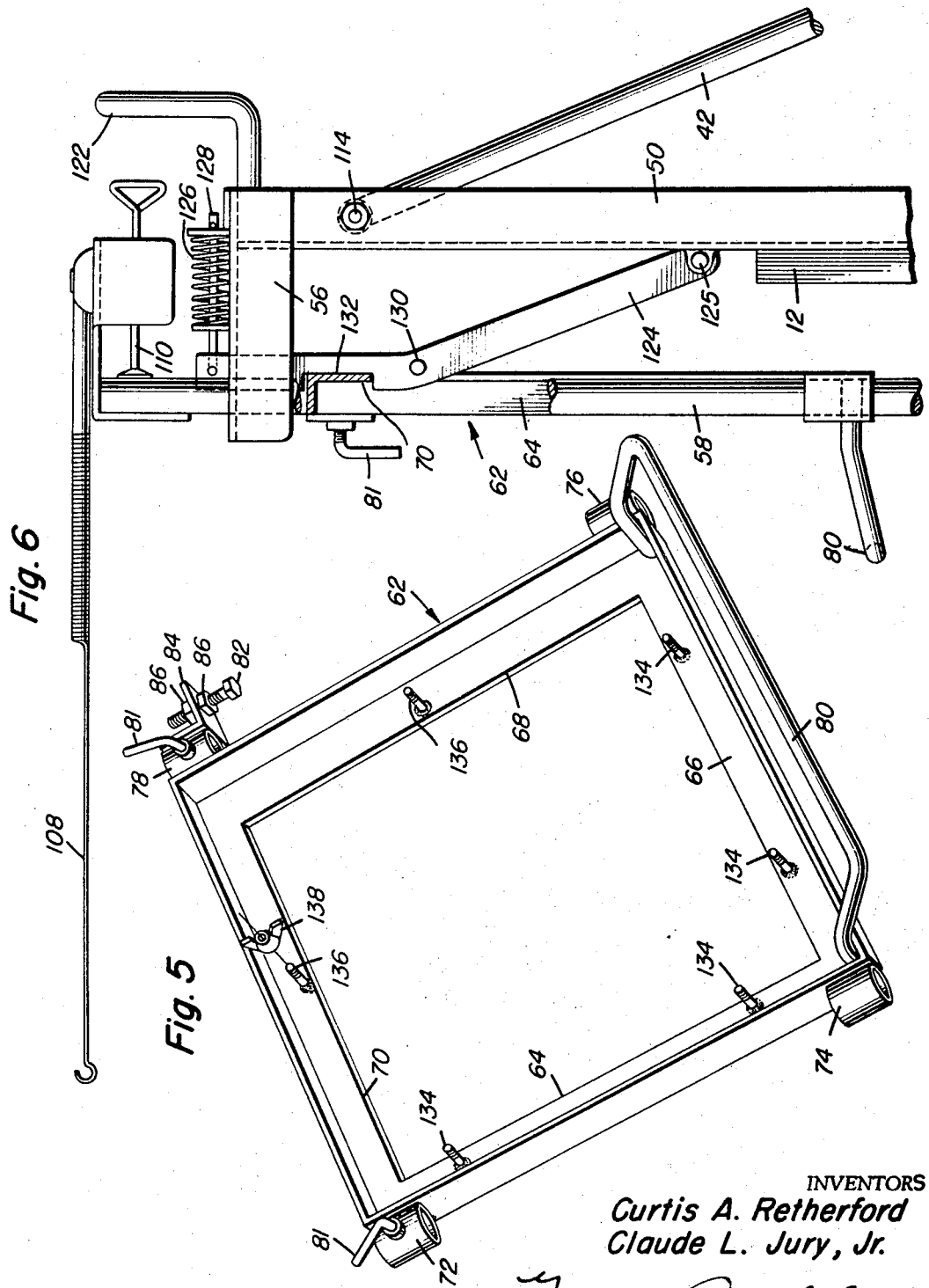

United States Patent Office 3,403,709
Patented Oct. 1, 1968

3,403,709
PANEL BOARD POWER SAW APPARATUS
Curtis A. Retherford, 307 N. Colorado, and Claude L. Jury, Jr., Star Rte., both of Ulysses, Kans. 67880
Filed Aug. 16, 1965, Ser. No. 479,751
11 Claims. (Cl. 143—47)

ABSTRACT OF THE DISCLOSURE

This invention is a panel board sawing apparatus wherein a conventional portable saw may be mounted on a special carriage which is vertically movable on a rectangular frame providing a stand, the stand having a back board secured thereto, the back board having supporting legs at the bottom in a tripod arrangement, the middle leg of which is adjustable to support the stand at any desired adjustment angle, and also has another support in the form of a hook at the top which may be hung on a well so that the saw may be operated with the panel board supported on a ledge at the bottom of the back board in a vertical position. The ledge at the bottom may be adjusted at one end to compensate for any irregularity in the edge of the panel board being sawed, and the saw carriage is provided with a latch for holding it at the top of the stand while the panel board work piece is being inserted or removed. Then, when the latch is released, the weight of the saw and the carriage help the saw in cutting vertically down through the panel board. The power for the saw is derived from an outlet mounted on the frame which has a circuit through a switch in the path of an abutment on the saw frame so that when the saw is at its lowermost point, the switch automatically cuts off the operation of the saw. When the saw has been raised again to the position for a new operation, the switch, which is a double acting switch, is manually operated to initiate action of the saw. The special carriage has additional thread bolts thereon for mounting the saw for making a vertical rather than a horizontal cut, in which case, the panel board being cut is slid around the legs in the cutting operation.

---

This invention relates to a panel board power saw apparatus and has for an object to provide an improved apparatus for use with a conventional portable power saw so as to readily make vertical or horizontal saw cuts through panel boards of any nature such as plywood, hardwood, etc. of a thickness up to the depth of cut for which a portable power saw can be adjusted, usually three inches, plywood panel boards usually being available in four by eight foot panels. It is often necessary and desirable to be able to make straight cuts, either vertically or horizontally through such panels and this apparatus makes it easy and convenient to use a conventional portable power saw for this purpose, yet leaves the saw readily removable for any other purpose, and readily attachable for this particular purpose.

A further object of this invention is to provide an apparatus of this nature wherein the power saw may be readily attached for either vertical or horizontal cuts, wherein a saw carriage is provided to receive the saw, which carriage may be locked in any position for cross cuts by moving the panel past the saw to make a cut of the desired length, and which may cut vertically in a downward direction, with a latch to maintain the saw at the top while the panel is being inserted, and with a double acting switch to automatically cut off the electric power either when contacted by the bottom of the panel as the vertical cut is finished, or if the carriage and saw are accidentally released to travel to the bottom.

A further object of this invention is to provide an apparatus having a tripod leg arrangement for standing it up where space is sufficient, and a top loop for hanging it on a suitable hook either where used in a crowded area, or for storage purposes, the third tripod leg being foldable against the rest of the apparatus.

Still a further object of this invention is to provide an apparatus wherein a clamp is provided for holding the panel being cut, and a ledge is provided at the bottom for supporting the bottom edge of the panel, with an adjustment for the ledge should the bottom edge of the panel be somewhat irregular.

A further object of this invention is to provide an apparatus wherein a saw carriage is provided with a convenient handle for moving it up or down, and wherein the carriage and saw are so readily movable vertically that no conventional counterweight is necessary.

In brief, this invention is an apparatus for maintaining a panel of plywood, hardwood, or other wide board, within the depth cutting limits of a portable power saw, in position for being readily cut, vertically or horizontally, by a portable power saw detachably secured to the carriage, the apparatus includes a stand on which is mounted a backboard with a leg affixed at its bottom adjacent each end, a partly adjustable ledge across the bottom, a panel clamp at its top and a saw carriage having rail encompassing sleeves slidable on pipe rails attached to and forming part of the stand. For safety, the power to the power saw is provided by an electrical outlet, attachable by an extension to any suitable source of electricity, in which the power line of the saw is plugged, the power line being supported by an aerial to hold it out of the possible path of the carriage or saw. In addition, a double acting switch is mounted thereon in the path of the carriage for automatically cutting off the power when the carriage reaches the bottom of the stand. A tripod foldable leg is provided for supporting the stand in cutting operation at a suitable angle, while a hook cooperating loop is provided at the top of the stand, either for supporting it when in a crowded area, or for storage purposes, the tripod leg being folded.

With the above and other objects in view which will become apparent from the following specification when read in conjunction with the accompanying drawings, in which:

FIG. 1 is a front elevational view of a panel board power saw apparatus arranged for a vertical cut.

FIG. 2 is a fragmentary similar view arranged for a horizontal cut.

FIG. 5 is a perspective view of the saw carriage.

FIG. 6 is an enlarged fragmentary view on line 6—6 of FIG. 1, broken away to show the holding latch and power line supporting aerial.

Figure 4:
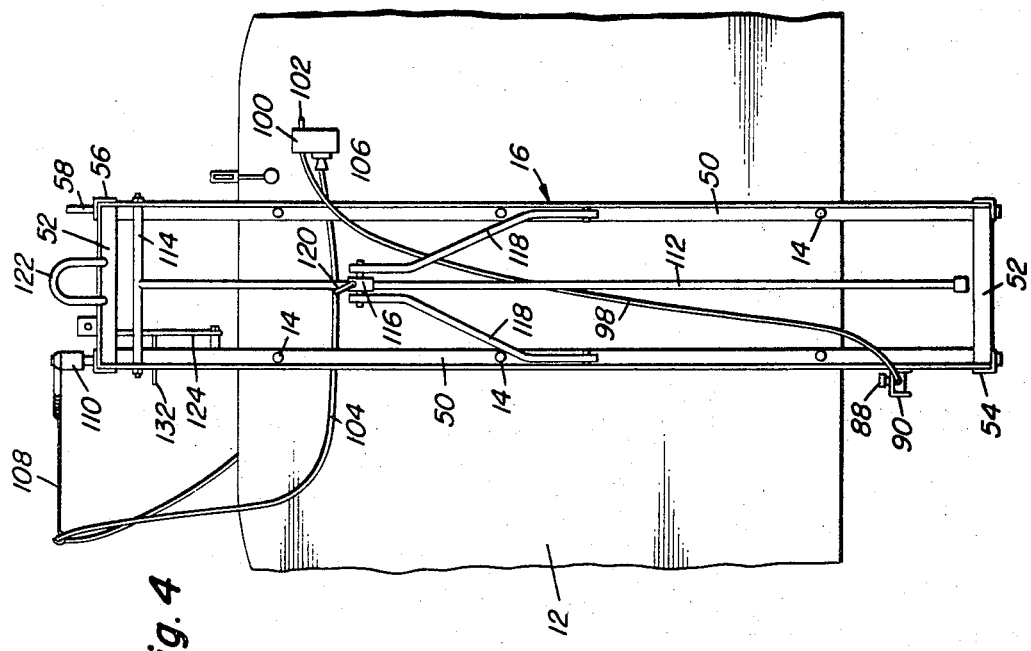
FIG. 4 is a fragmentary rear elevation of FIG. 3.

There is shown at 10 the panel board power saw apparatus of this invention as including a backboard 12 mounted by suitable fastenings 14 on a stand 16. Adjacent each side edge at its bottom is affixed a leg 18 by fastenings 20, the legs 18 preferably being of angle iron. Similar but slightly larger pieces of angle iron are used to provide ledges at 22 and 24 along the bottom edge of the backboard and provide a vertically adjustable panel bottom supporting ledge. One angle iron ledge 22 is fixedly secured at each of its end, by fastenings 26, extending from about the middle to one end of the backboard. The other angle iron 24 is pivotally secured at 28 adjacent the middle bottom of the backboard 12 and extends to the other end, where it is secured by an adjustable L-bracket 30 to the bottom of the backboard 12 to provide for supporting panels which may have a somewhat irregular edge.

This bracket 30 is L shaped as shown, and is fastened, as by screws 32, to one side of the backboard 12, and has a vertical slot therein aligned with a similar slot in the backboard, a bolt 34 through the angle iron ledge 24 extending through these aligned slots 36 and being secured in adjusted position by a nut 38. In the horiozntal leg 40 of the L-bracket 30, L-screw 42 is threaded through a nut 44 welded to leg 40 to abut against the bottom of the angle iron ledge 24. To adjust the angle of the angle iron ledge 24, nut 38 is loosened, the L-screw is turned to adjust the ledge 24 up or down, then nut 38 is tightened to hold it rigid.

The stand 16 consists of a frame having two spaced apart vertically extending angle irons 50 secured in spaced relation by cross bars 52 at its top and bottom. Extending forwardly from the top and bottom of each vertical angle iron 50 are rigid angle iron straps 54 and 56. ¾" cold rolled steel rails 58 are suitably mounted and secured on these forward straps 54 and 56 in proper spaced relation to the vertical angle irons 50. One suitable securing means may be stud bolts 60 extending through suitable apertures in the bottom straps 54 and threaded into the bottom of the ¾" steel rails 58 to hold them thereagainst, while the top ends of the rails 58 extend through suitable apertures in the top straps 56, thus removably holding them in place. Slidably supported on these ¾" steel rails is a portable power saw carriage 62, substantially square in outline and made of angle iron sides, 64, 66, 68 and 70, with two spaced apart rail encompassing sleeves 72, 74, 76 and 78, two being on each of the sides 64 and 68. With these sleeves about the ¾" steel rails 58, the carriage may be readily moved up or down by means of the somewhat U-shaped handle bar 80 secured at the bottom thereof. Locking or braking L studs 81 are threaded through the two sleeves 72 and 78, so that the carriage may be locked or braked on the ¾" steel rails at any desired location.

An adjustable abutment stud 82 is threaded through an L bracket 84 fastened as by welding to the outer side of sleeve 78, and is held in adjusted position by nuts 86. This stud 82 cooperates with the switch button 88 of a double action switch 90 secured to one of the stand vertical angle irons 50 in proper spaced relation to its bottom, in the path of movement of the stud 82, which is adjusted to automatically actuate the switch button 88 to "OFF" position when the saw blade 92 of a conventional power saw 94 has just completed its vertical cut 144 in the panel 96 being cut. This switch 90 is connected by power line 98 to an outlet receptacle box 100 which may be connected by its prongs 102 by any extension cord (not shown) to any suitable available source of electricity. The saw power cord 104 is plugged at 106 into the outlet box 100, and is supported by an aerial spring supported arm 108 so as to be completely clear of the path of the saw at all times. The arm 108 is supported on a clamp 110 secured on the stand 16.

Figure 3:
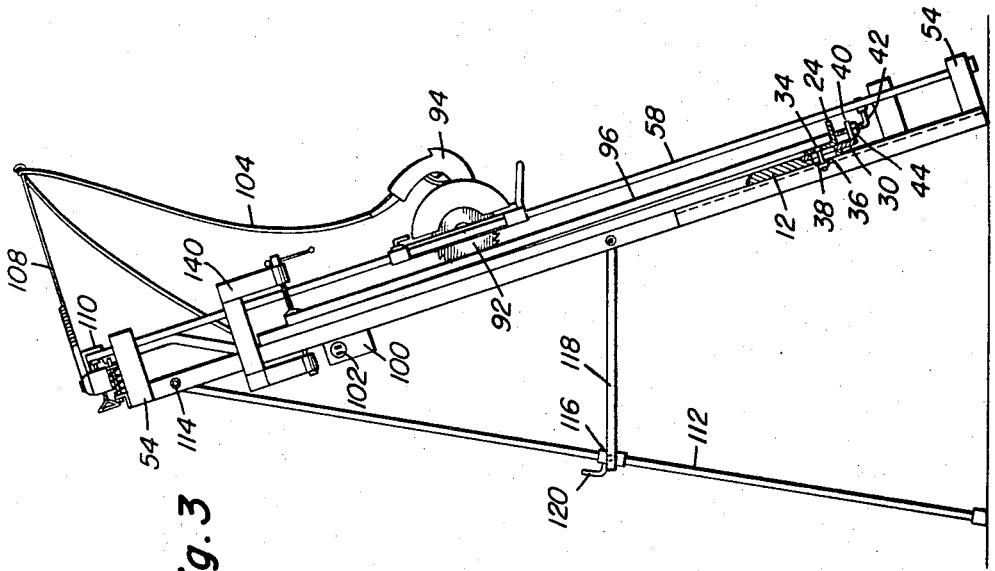
FIG. 3 is an end elevational view showing the tripod support.

A tripod T-shaped leg 112 is pivoted by its T head 114 between the stand angle irons 50, the leg 112 sliding through a sleeve 116 pivoted between two arms 118 pivoted also on the stand angle irons 50 but at about their mid-points, with an L screw 120 for locking the leg 112 in either tripod supporting position, shown in FIG. 3, or collapsed position shown in FIG. 4, in which collapsed position, it may either by hung by a hanger loop 122 on its top cross bar 62 from a suitable hook for use in a crowded area, or for storage.

A bent latch arm 124 is pivoted at 125 to one stand angle iron 50 and is yieldably urged by a spring 126 and plunger 128 mounted on the same stand angle iron 50 against the adjacent ¾" steel rail 58, with a finger 130 abutting the ¾" steel rail to limit its movement. The latch arm 124 has a notch 132 so located that the bent latch arm yieldably permits the saw carriage 62 to have its top side 70 latched therein when it is raised to the top and held by the spring 126. To release the saw carriage for downward movement, the latch arm is manually retracted against its spring 126.

Symmetrically spot welded to the two carriage sides 64 and 66 are a pair of spaced apart threaded studs 134, and symmetrically and centrally secured to the two carriage sides 78 and 70 are single similar threaded studs 136, cooperating with wing nuts 138. The base 140 of the conventional portable power saw 94 has correspondingly spaced apertures formed therein, if not already present, so that it may be placed over one pair of studs 134 and their opposite single stud 136 and held in position thereon by nuts 138. Depending on which of the three studs are used, the saw is placed for either a vertical saw cut, as in FIG. 3, or a horiozntal saw cut as in FIG. 2. A C-clamp 142 mounted on the backboard 12 holds the top of the panel 96 when in position on the adjusted ledges 22 and 24.

In operation, the apparatus 10 is placed in tripod position, as in FIG. 3, or in hanger loop supported position, as in FIG. 4, with the saw positioned for the desired direction of cut. The saw carriage 62 is raised to the top and automatically latched by the latch arm 124 when a vertical cut is to be made. The panel 96 is then placed on the backboard 12 on the ledges 22 and 24 and clamped by the C-clamp 142. An extension cord, not shown, is connected from the source of electricity, not shown, to the outlet box prongs 102, and the saw 92 is adjusted for a depth of cut to just touch mark the backboard 12 in its conventional manner, according to the thickness of the panel 96 being cut. The switch button 88 is manually depressed to start the saw blade 92 into cutting rotation, and the power saw 94 is then released by lifting the latch 124, and then fed down, manually by handle 80 or by gravity, until it completes the vertical panel cut 144 to the bottom, at which time the abutment stud 82 hits the switch button 88, this time interrupting the circuit therethrough, thus stopping the rotation of the saw blade.

If a horizontal cut is being made, as in FIG. 2, the saw is secured by the other set of studs 134 and 136 in the position shown in FIG. 2 and lowered to the desired position, and then held in the desired position by the lock or brake L studs 81 being manually tightened against the ¾" steel rails 58. The switch button 88 is manually actuated, and the panel is fed transversely on the ledges 22 and 24 against the rotating saw blade 92 until the horizontal cut 146 is completed, and the switch button 88 is then manually actuated to stop the rotation of the blade.

The power saw 94 may then be removed for another conventional use or uses when desired.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A panel board power saw apparatus comprising a stand, a backboard secured on said stand, a panel supporting ledge on said backboard adjacent its bottom edge, said stand including a rectangular frame to which said backboard is secured, a pair of spaced apart rails secured on said frame in forwardly spaced relation thereto, a power saw carriage, means movably mounting said carriage on said rails, a carriage retaining latch mounted on said stand adjacent the top thereof in the upward path of said carriage, means for mounting a power saw on said carriage, and means for supporting said stand.

2. The apparatus of claim 1, said stand supporting means comprising a hanger loop secured at the top thereof.

3. The apparatus of claim 1, said stand supporting means comprising a pair of legs secured to said backboard adjacent its opposite side bottom edges, and a tripod leg pivotally secured to said stand.

4. The apparatus of claim 3, said tripod leg being pivoted to said stand adjacent its top, and leg position securing means pivoted to said stand adjacent its mid area, said position securing means being adjustable to hold said leg in either extended adjustable supporting position or retracted storing position.

5. The apparatus of claim 1, said carriage comprising a substantially square angle iron frame, a pair of spaced apart rail encompassing sleeves secured on each of two opposite sides, a pair of symmetrically spaced apart threaded studs secured on each of two adjacent sides of said carriage frame and a single threaded stud symmetrically located on each of the other two adjacent sides of said carriage frame, each single stud and oppositely located pair of studs and nut means therefore providing securing means for mounting the base of a portable power saw thereon in selected position thereon.

6. The apparatus of claim 5, and a rail locking screw threaded through at least one rail encompassing sleeve.

7. The apparatus of claim 6, and a double acting switch on said stand adjacent the bottom thereof in the downward path of said carriage, and a switch abutment on one lower rail sleeve, said double acting switch being in the path of said switch abutment.

8. The apparatus of claim 1, and a work panel holding clamp mounted on said stand.

9. The apparatus of claim 5, said panel supporting ledge including an angle iron pivoted at one end to said backboard adjacent its bottom mid area, bolt and slot means securing the other end of said angle iron to said backboard adjacent its bottom edge area, and threaded angle iron angle adjusting screw secured to a bracket on said backboard against the bottom of said angle ledge angle iron.

10. The apparatus of claim 9, and a second angle iron fixedly secured to said backboard adjacent its mid and opposite bottom edge areas in alignment with the pivoted end of said pivoted angle iron.

11. The apparatus of claim 7, an electric outlet mounted on said stand, in combination with a portable power saw secured in a selected position on said carriage frame, and a power conduit on said power saw plugged into said outlet.

References Cited
UNITED STATES PATENTS

| | | |
|---|---|---|
| 2,347,359 | 4/1944 | Miller. |
| 2,785,708 | 3/1957 | Krogen. |
| 2,973,020 | 2/1961 | Bennett. |
| 3,008,498 | 11/1961 | Olson. |
| 3,225,865 | 12/1965 | Downey ---------- 144—286 X |

DONALD R. SCHRAN, *Primary Examiner.*